(12) United States Patent
Huang et al.

(10) Patent No.: US 11,170,943 B2
(45) Date of Patent: Nov. 9, 2021

(54) SUPERCAPACITOR ELECTRODE, MANUFACTURING METHOD THEREOF, AND SUPERCAPACITOR

(71) Applicant: National Taiwan University of Science and Technology, Taipei (TW)

(72) Inventors: Bohr-Ran Huang, Taipei (TW); Adhimoorthy Saravanan, Taipei (TW); Shyan-Kay Jou, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 0 days.

(21) Appl. No.: 16/865,410

(22) Filed: May 3, 2020

(65) Prior Publication Data

US 2021/0296056 A1    Sep. 23, 2021

(30) Foreign Application Priority Data

Mar. 23, 2020  (TW) .................. 109109570

(51) Int. Cl.
*H01G 11/36* (2013.01)
*H01G 11/86* (2013.01)
*H01G 11/24* (2013.01)

(52) U.S. Cl.
CPC .......... *H01G 11/36* (2013.01); *H01G 11/24* (2013.01); *H01G 11/86* (2013.01)

(58) Field of Classification Search
CPC ........ H01G 11/22; H01G 11/24; H01G 11/36; H01G 11/42
See application file for complete search history.

(56) References Cited

U.S. PATENT DOCUMENTS

| 9,612,258 B2 | 4/2017 | Hantschel et al. | |
| 2009/0258255 A1* | 10/2009 | Terashima | H01M 4/96 429/483 |
| 2019/0103233 A1* | 4/2019 | Kobayashi | H01G 11/68 |

FOREIGN PATENT DOCUMENTS

| CN | 104451545 | | 3/2015 | |
| CN | 106971864 | | 7/2017 | |
| CN | 110277251 | A * | 9/2019 | |
| JP | 2014080685 | A * | 5/2014 | H01G 11/66 |
| TW | 201251091 | | 12/2012 | |
| TW | 201347282 | | 11/2013 | |
| TW | 201429035 | | 7/2014 | |
| TW | I472642 | | 2/2015 | |

OTHER PUBLICATIONS

Siyu Yu, et al.,"Battery-like supercapacitors from diamond networks and water-soluble redox electrolytes", Journal of Material Chemistry A, Dec. 15, 2016, pp. 1778-1785.

(Continued)

*Primary Examiner* — Eric W Thomas
(74) *Attorney, Agent, or Firm* — JCIPRNET (57) ABSTRACT

A supercapacitor electrode includes a substrate and at least one nitrogen-doped ultra-nanocrystalline diamond layer. The nitrogen-doped ultra-nanocrystalline diamond layer is disposed on the substrate. The nitrogen-doped ultra-nanocrystalline diamond layer is a dense continuous film. A conductivity of the supercapacitor electrode is 130 S/cm or more. In addition, a manufacturing method of a supercapacitor electrode is provided.

8 Claims, 11 Drawing Sheets

(56) References Cited

OTHER PUBLICATIONS

JoaoO Vitor Silva Moreira, et al."Diamond and carbon nanotube composites for supercapacitor devices", Journal of Electronic Materials, Oct. 21, 2016, pp. 929-935.
"Office Action of Taiwan Counterpart Application", dated May 14, 2020, p. 1-p. 9.

* cited by examiner

SUPERCAPACITOR ELECTRODE, MANUFACTURING METHOD THEREOF, AND SUPERCAPACITOR

CROSS-REFERENCE TO RELATED APPLICATION

This application claims the priority benefit of Taiwan application serial no. 109109570, filed on Mar. 23, 2020. The entirety of the above-mentioned patent application is hereby incorporated by reference herein and made a part of this specification.

BACKGROUND

Technical Field

The disclosure relates to an electrode and a manufacturing method thereof, and in particular to a supercapacitor electrode and a manufacturing method thereof.

Description of Related Art

Compared with conventional electrolytic capacitors, supercapacitors are electrochemical capacitors having higher energy density and higher capacitance. At present, materials of supercapacitor electrodes are, for example, nano porous boron-doped diamond films, porous networks boron-doped diamond films, composite materials in which a boron-doped diamond film is plated on an array of carbon nanotubes, composite materials in which a diamond-like carbon film is plated on carbon nanotubes, or the like. However, the above-mentioned materials of the supercapacitor electrodes are mostly at a micron scale in size and have a porous structure, and the specific capacitance of the materials is generally not high.

SUMMARY

The disclosure provides a supercapacitor electrode having a high specific capacitance or a good conductivity.

The disclosure provides a manufacturing method of a supercapacitor electrode configured to manufacture the supercapacitor electrode.

The supercapacitor electrode provided in an embodiment of the disclosure includes a substrate and at least one nitrogen-doped ultra-nanocrystalline diamond layer. The at least one nitrogen-doped ultra-nanocrystalline diamond layer is disposed on the substrate. The at least one nitrogen-doped ultra-nanocrystalline diamond layer is a dense continuous film. A conductivity of the supercapacitor electrode is 130 S/cm or more.

In an embodiment of the disclosure, the at least one nitrogen-doped ultra-nanocrystalline diamond layer has a needle-shaped planar crystal structure.

In an embodiment of the disclosure, a specific capacitance of the supercapacitor electrode at a scanning rate of 10 mV/s is 100 F/g or more.

In an embodiment of the disclosure, after the supercapacitor electrode is charged/discharged 1000 times to 2000 times, the supercapacitor electrode still retains a specific capacitance of 95% or more.

In an embodiment of the disclosure, when the number of the at least one nitrogen-doped ultra-nanocrystalline diamond layer is two, a specific capacitance of the supercapacitor electrode at the scanning rate of 10 mV/s is 200 F/g or more, and the conductivity of the supercapacitor electrode is 320 S/cm.

A supercapacitor provided in an embodiment of the disclosure includes the supercapacitor electrode.

A manufacturing method of a supercapacitor electrode provided in an embodiment of the disclosure includes steps as follows. First, a substrate is provided. Next, at least one nitrogen-doped ultra-nanocrystalline diamond layer is formed on the substrate. The at least one nitrogen-doped ultra-nanocrystalline diamond layer is a dense continuous film. A conductivity of the supercapacitor electrode is 130 S/cm or more.

In an embodiment of the disclosure, a method for forming the at least one nitrogen-doped ultra-nanocrystalline diamond layer on the substrate is microwave plasma chemical vapor deposition.

In an embodiment of the disclosure, the step of forming the at least one nitrogen-doped ultra-nanocrystalline diamond layer on the substrate includes steps as follows. A temperature of the substrate is set to 500° C. to 550° C. A gas mixture composed of methane, hydrogen, argon, and nitrogen is introduced. A flow ratio of the methane:the hydrogen:the argon:the nitrogen is 15 sccm:15 sccm:45 sccm:150 sccm. The at least one nitrogen-doped ultra-nanocrystalline diamond layer is deposited on the substrate for 10 minutes to 40 minutes.

In an embodiment of the disclosure, when the number of the at least one nitrogen-doped ultra-nanocrystalline diamond layer is two, after depositing the nitrogen-doped ultra-nanocrystalline diamond layer on the substrate, the method further includes steps as follows. The temperature of the substrate is reduced to room temperature and maintained for a period of time. The substrate is reheated to 500° C. to 550° C. Another nitrogen-doped ultra-nanocrystalline diamond layer is deposited on the at least one nitrogen-doped ultra-nanocrystalline diamond layer for 10 minutes to 40 minutes.

Based on the above, in the supercapacitor electrode and the manufacturing method thereof according to one or more embodiments of the disclosure, since the supercapacitor electrode has the nano-scale nitrogen-doped ultra-nanocrystalline diamond layer, the supercapacitor electrode provided in one or more embodiments of the disclosure has higher specific capacitance or better conductivity than the conventional supercapacitor electrode. In addition, in the present embodiment, by optimizing the manufacturing method of the supercapacitor electrode, it is known that the supercapacitor electrode deposited with two nitrogen-doped ultra-nanocrystalline diamond layers respectively for a deposition time of 20 minutes may have even higher specific capacitance or better conductivity.

In order to make the aforementioned and other features and advantages provided in the disclosure invention comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments provided in the disclosure and, together with the description, serve to explain the inventive principles.

DESCRIPTION OF THE EMBODIMENTS

Figure 1A:
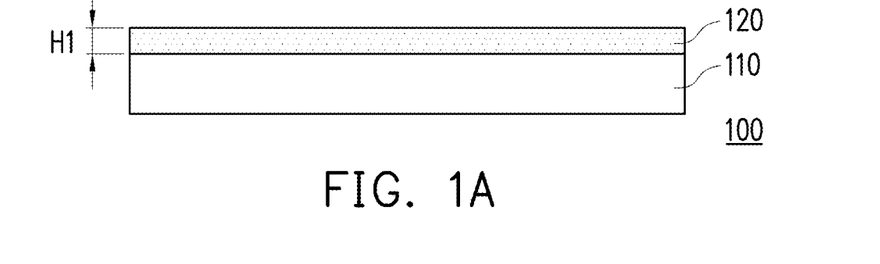
FIG. 1A is a schematic cross-sectional view of a supercapacitor electrode according to an embodiment of the disclosure.
Figure 1B:
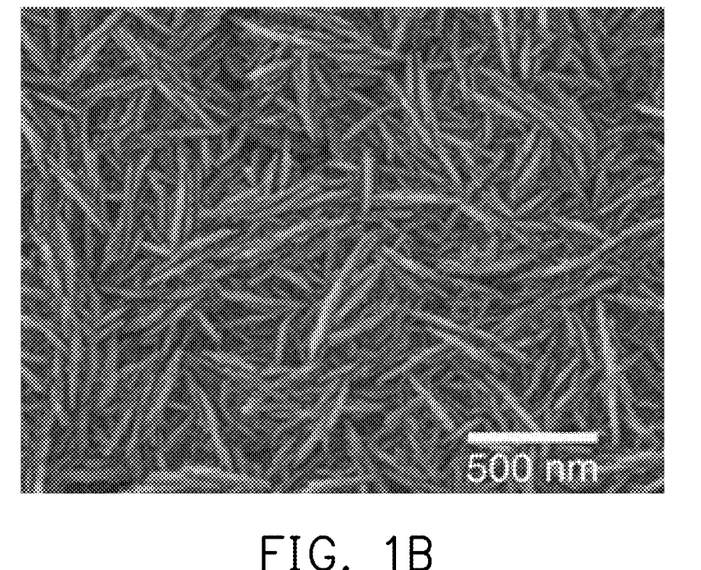
FIG. 1B is a scanning electron microscopy image of a nitrogen-doped ultra-nanocrystalline diamond layer in the supercapacitor electrode depicted in FIG. 1A.

FIG. 1A is a schematic cross-sectional view of a supercapacitor electrode according to an embodiment of the disclosure. FIG. 1B is a scanning electron microscopy image of a nitrogen-doped ultra-nanocrystalline diamond layer in the supercapacitor electrode depicted in FIG. 1A. With reference to FIG. 1A, a supercapacitor electrode 100 of the present embodiment includes a substrate 110 and at least one nitrogen-doped ultra-nanocrystalline diamond layer 120. The nitrogen-doped ultra-nanocrystalline diamond layer 120 is disposed on the substrate 110 such that the nitrogen-doped ultra-nanocrystalline diamond layer 120 completely covers the substrate 110. In the present embodiment, the substrate 110 is, for example, a silicon chip, which should however not be construed as a limitation in the disclosure. A conductivity of the supercapacitor electrode 100 is, for example, 130 S/cm or more, which should however not be construed as a limitation in the disclosure.

With reference to FIG. 1B, in the present embodiment, the nitrogen-doped ultra-nanocrystalline diamond layer 120 includes a nitrogen-doped ultra-nanocrystalline diamond (N-UNCD) material. Next, according to the scanning electron microscopy image of the nitrogen-doped ultra-nanocrystalline diamond layer 120, it can be seen that the nitrogen-doped ultra-nanocrystalline diamond layer 120 is a dense continuous film. The nitrogen-doped ultra-nanocrystalline diamond material has a uniform needle-shaped planar crystal structure, and an average length of the crystal structure is, for example, 400 nanometers. In addition, in the present embodiment, a grain width of the nitrogen-doped ultra-nanocrystalline diamond material is, for example, 10 nanometers to 40 nanometers, which should however not be construed as a limitation in the disclosure. From measurement results of atomic force microscopy (AFM), it can be seen that the nitrogen-doped ultra-nanocrystalline diamond layer 120 has a smooth surface, and has a surface roughness of, for example, 44.5 nanometers, which should however not be construed as a limitation in the disclosure.

In the present embodiment, a manufacturing method of the supercapacitor electrode 100 includes steps as follows. First, the substrate 110 is provided. The substrate 110 is, for example, a silicon chip, which should however not be construed as a limitation in the disclosure. Next, the nitrogen-doped ultra-nanocrystalline diamond layer 120 is formed on the substrate 110. A method for forming the nitrogen-doped ultra-nanocrystalline diamond layer 120 is, for example, microwave plasma chemical vapor deposition (MPCVD), which should however not be construed as a limitation in the disclosure. In the present embodiment, reaction conditions of the microwave plasma chemical vapor deposition include: a temperature of the substrate 110 is made to, for example, 500° C. to 550° C.; a gas mixture composed of methane, hydrogen, argon and nitrogen is introduced, a flow ratio of the methane:the hydrogen:the argon:the nitrogen is, for example, 15 sccm:15 sccm:45 sccm:150 sccm; and a time for depositing the nitrogen-doped ultra-nanocrystalline diamond layer 120 is, for example, 10 minutes to 40 minutes. In the present embodiment, a deposition thickness H1 of the nitrogen-doped ultra-nanocrystalline diamond layer 120 is, for example, 320 nanometers to 1180 nanometers, which should however not be construed as a limitation in the disclosure.

In the present embodiment, a specific capacitance of the supercapacitor electrode 100 at a scanning rate of 10 mV/s is, for example, 100 F/g or more, and it can be used as an electrode in a supercapacitor. In addition, although FIG. 1A schematically shows only one nitrogen-doped ultra-nanocrystalline diamond layer 120, the disclosure does not limit the number of the nitrogen-doped ultra-nanocrystalline diamond layers. That is, in some embodiments, there may also be two (as shown in FIG. 1C) or more nitrogen-doped ultra-nanocrystalline diamond layers.

Other embodiments are listed below for illustration. It must be noted here that the following embodiments follow the component signs and partial contents of the preceding embodiments. The same reference signs are used to denote the same or similar components, and the description of the same technical contents is omitted. For the description of the omitted part, reference may be made to the preceding embodiments, and the details will not be repeated in the following embodiments.

Figure 1C:
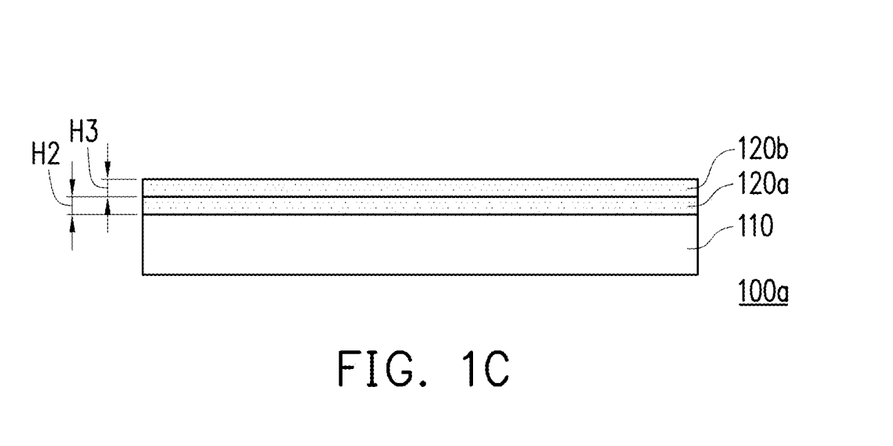
FIG. 1C is a schematic cross-sectional view of a supercapacitor electrode according to another embodiment of the disclosure.
Figure 2A:
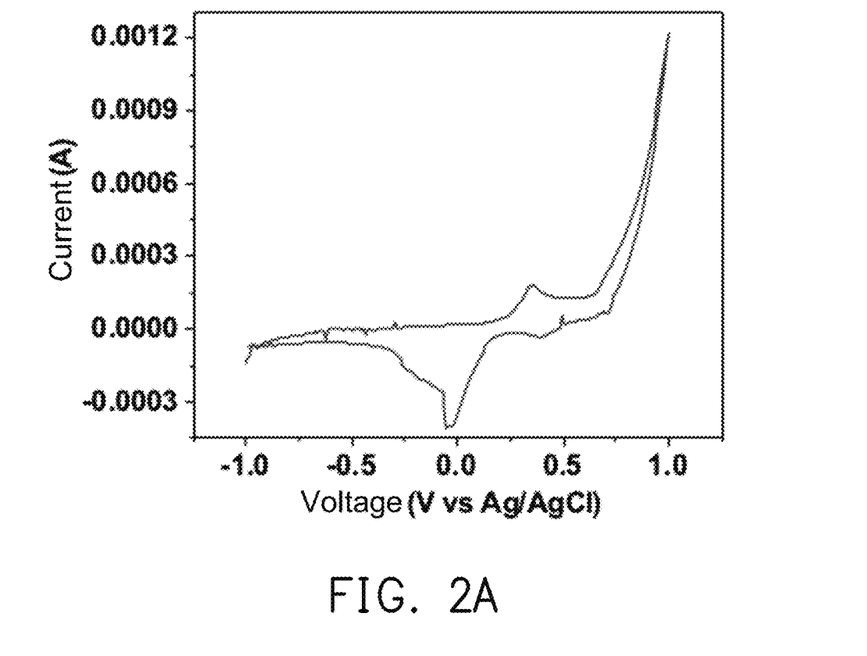
FIG. 2A to FIG. 2F are curve diagrams illustrating cyclic voltammetry analysis of supercapacitor electrodes according to various embodiments of the disclosure.
Figure 2B:
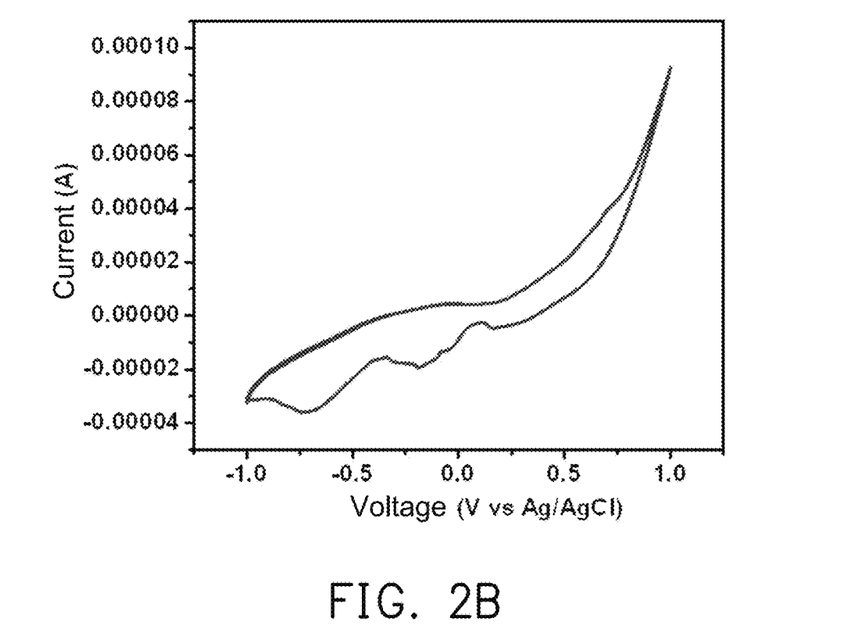
Figure 2C:
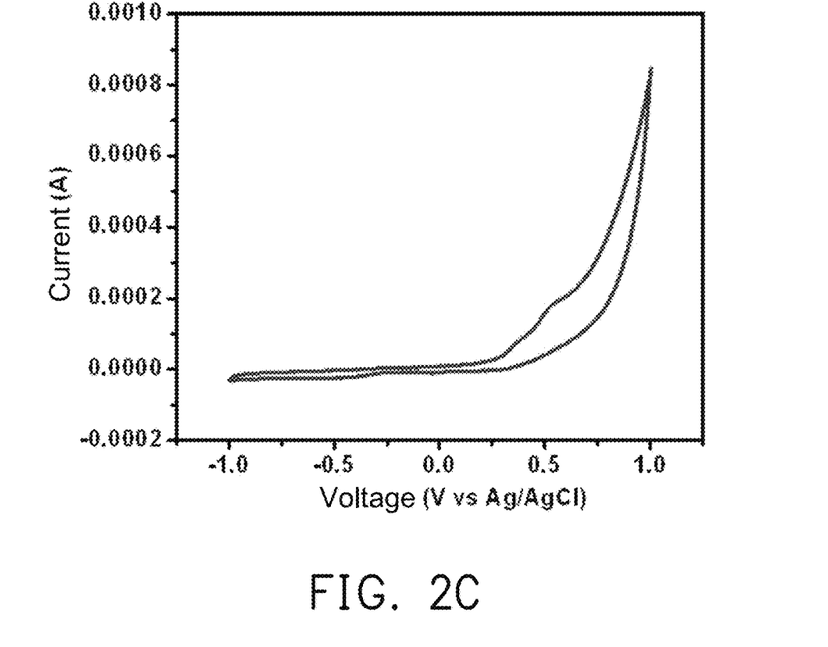
Figure 2D:
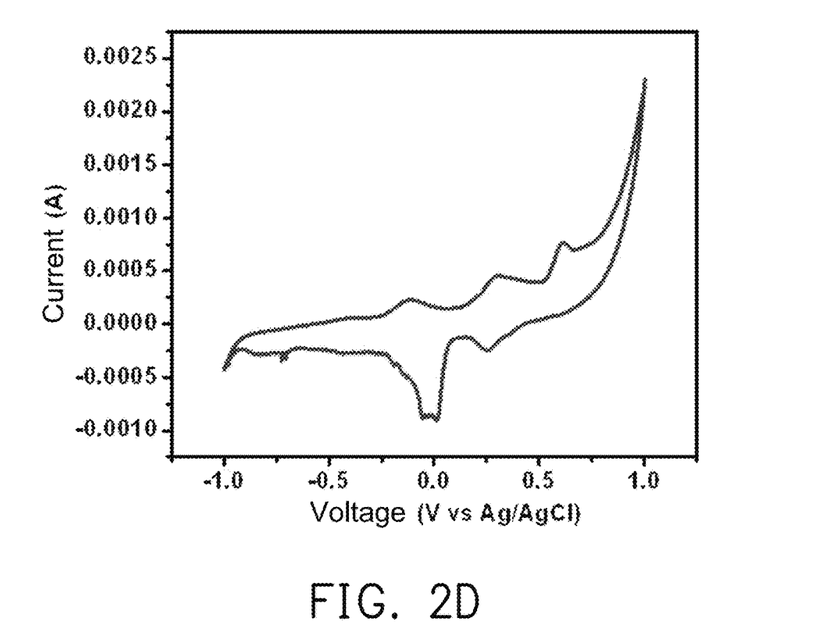
Figure 2E:
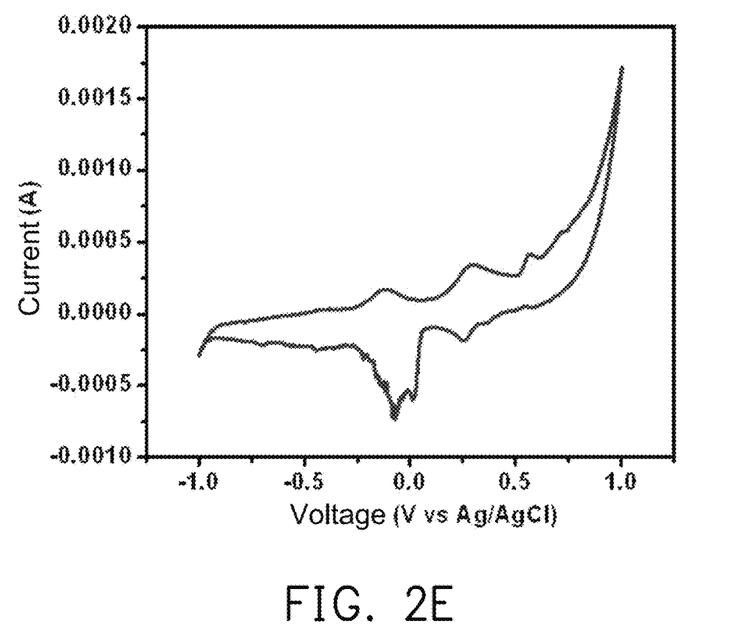
Figure 2F:
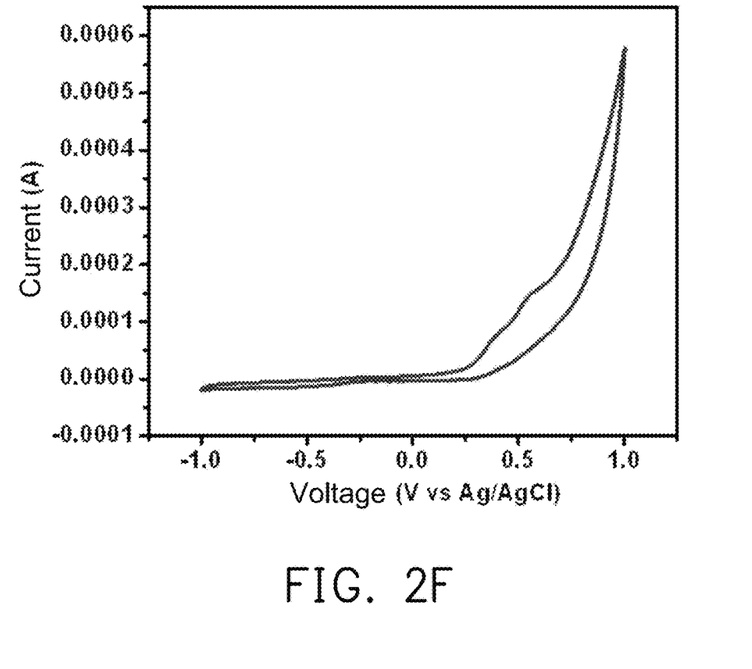

FIG. 1C is a schematic cross-sectional view of a supercapacitor electrode according to another embodiment of the disclosure. With reference to FIG. 1A and FIG. 1C at the same time, a supercapacitor electrode 100a of the present embodiment is similar to the supercapacitor electrode 100 in FIG. 1A, but a main difference between the two is that the supercapacitor electrode 100a of the present embodiment has two nitrogen-doped ultra-nanocrystalline diamond layers 120a, 120b.

With reference to FIG. 1C, the supercapacitor electrode 100a of the present embodiment includes a substrate 110, a first nitrogen-doped ultra-nanocrystalline diamond layer 120a and a second nitrogen-doped ultra-nanocrystalline diamond layer 120b. The first nitrogen-doped ultra-nanocrystalline diamond layer 120a is located between the second nitrogen-doped ultra-nanocrystalline diamond layer 120b and the substrate 110.

In the present embodiment, a manufacturing method of the supercapacitor electrode 100a includes steps as follows. First, the substrate 110 is provided. The substrate 110 is, for example, a silicon chip, which should however not be construed as a limitation in the disclosure. Next, the first nitrogen-doped ultra-nanocrystalline diamond layer 120a is formed on the substrate 110. A method for forming the first nitrogen-doped ultra-nanocrystalline diamond layer 120a is, for example, microwave plasma chemical vapor deposition (MPCVD), which should however not be construed as a limitation in the disclosure. Reaction conditions of the microwave plasma chemical vapor deposition includes: a temperature of the substrate 110 is made to, for example, 500° C. to 550° C.; a gas mixture composed of methane, hydrogen, argon and nitrogen is introduced, a flow ratio of the methane:the hydrogen:the argon:the nitrogen is, for example, 15 sccm:15 sccm:45 sccm:150 sccm; and a time for depositing the first nitrogen-doped ultra-nanocrystalline diamond layer 120a is, for example, 10 minutes to 40 minutes. Then, the temperature of the substrate 110 is reduced to room temperature, and held for a period of time. Afterward, the substrate 110 is reheated to 500° C. to 550° C. The second nitrogen-doped ultra-nanocrystalline diamond layer 120b is deposited on the first nitrogen-doped ultra-nanocrystalline diamond layer 120a for 10 minutes to 40 minutes. In the present embodiment, a deposition thickness H2 of the first nitrogen-doped ultra-nanocrystalline diamond layer 120a is, for example, 320 nanometers to 840 nanometers, and a deposition thickness H3 of the second nitrogen-doped ultra-nanocrystalline diamond layer 120b is, for example, 320 nanometers to 840 nanometers, which should however not be construed as a limitation in the disclosure.

In the present embodiment, compared with the supercapacitor electrode 100 having one nitrogen-doped ultra-nanocrystalline diamond layer 120, since the supercapacitor electrode 100a has two nitrogen-doped ultra-nanocrystalline diamond layers 120a, 120b, the supercapacitor electrode 100a has better specific capacitance and conductivity. In the present embodiment, the specific capacitance of the supercapacitor electrode 100a at a scanning rate of 10 mV/s is, for example, 200 F/g or more or 3.12 F/cm$^2$ or more, and the conductivity is, for example, 320 S/cm, which should however not be construed as a limitation in the disclosure.

EMBODIMENTS

Different experiments are used below to optimize the manufacturing method of the supercapacitor electrode, so as to enable the supercapacitor electrode of the present embodiment to have better specific capacitance or better conductivity. 6 groups of experiments were performed below. Different deposition times and different numbers of times of deposition were respectively adopted to manufacture supercapacitor electrodes having different number of nitrogen-doped ultra-nanocrystalline diamond layers, as shown in Table 1.

TABLE 1

Number of layers of deposition, deposition time, and deposition thickness of Embodiments 1-6

| | Number of Layers of Deposition | Deposition Time (min) | Deposition Thickness (Nanometers) |
|---|---|---|---|
| Embodiment 1 | 1 | 20 | 650 |
| Embodiment 2 | 1 | 40 | 1180 |
| Embodiment 3 | 2 | First layer: 10 | First layer: 320 |
| | | Second layer: 30 | Second layer: 840 |
| Embodiment 4 | 2 | First layer: 20 | First layer: 650 |
| | | Second layer: 20 | Second layer: 650 |
| Embodiment 5 | 2 | First layer: 30 | First layer: 840 |
| | | Second layer: 10 | Second layer: 320 |
| Embodiment 6 | 4 | First layer: 10 | First layer: 320 |
| | | Second layer: 10 | Second layer: 320 |
| | | Third layer: 10 | Third layer: 320 |
| | | Fourth layer: 10 | Fourth layer: 320 |

Next, cyclic voltammetry (CV) analysis, galvanostatic charge/discharge analysis, capacitance retention analysis and Raman spectrometer analysis were adopted to perform characteristic analysis on the supercapacitor electrodes of Embodiments 1-6.

[Cyclic Voltammetry Analysis]

FIG. 2A to FIG. 2F are curve diagrams illustrating cyclic voltammetry analysis of the supercapacitor electrodes according to various embodiments of the disclosure. With reference to FIG. 2A to FIG. 2F, in the present embodiment, the cyclic voltammetry analysis was performed respectively using the supercapacitor electrodes of Embodiments 1-6 as working electrodes. In the cyclic voltammetry analysis, for example, silver/silver chloride was used as a reference electrode, and platinum metal was used as a counter electrode, which should however not be construed as a limitation in the disclosure. Next, in a 1 M NaOH solution, cyclic voltammetry was performed at a scanning rate of 10 mV/s, and results of induced currents when the voltage of the working electrode drops from 1.0 V to −1.0 V and when the voltage of the working electrode rises from −1.0V to 1.0 V were measured. Then, according to the measurement results of the cyclic voltammetry, specific capacitances of the supercapacitor electrodes of Embodiments 1-6 were further calculated, as shown in Table 2.

TABLE 2

Specific capacitance and conductivity of supercapacitor electrodes of Embodiments 1-6

| | Specific Capacitance (F/g) | Conductivity (S/cm) |
|---|---|---|
| Embodiment 1 | 112 | 132 |
| Embodiment 2 | 121 | 155 |
| Embodiment 3 | 157 | 234 |
| Embodiment 4 | 243 | 320 |
| Embodiment 5 | 172 | 258 |
| Embodiment 6 | 41.5 | 86 |

It can be seen from the results of Table 2 that compared with the supercapacitor electrode having one nitrogen-doped ultra-nanocrystalline diamond layer (Embodiments 1, 2) and the supercapacitor electrode having four nitrogen-doped ultra-nanocrystalline diamond layers (Embodiment 6), the supercapacitor electrode having two nitrogen-doped ultra-nanocrystalline diamond layers (Embodiments 3, 4, 5) has better specific capacitance. In addition, compared with Embodiments 3 and 5, Embodiment 4, in which the first nitrogen-doped ultra-nanocrystalline diamond layer was deposited for a deposition time of 20 minutes and the second nitrogen-doped ultra-nanocrystalline diamond layer was deposited for a deposition time of 20 minutes, has better specific capacitance.

Figure 3A:
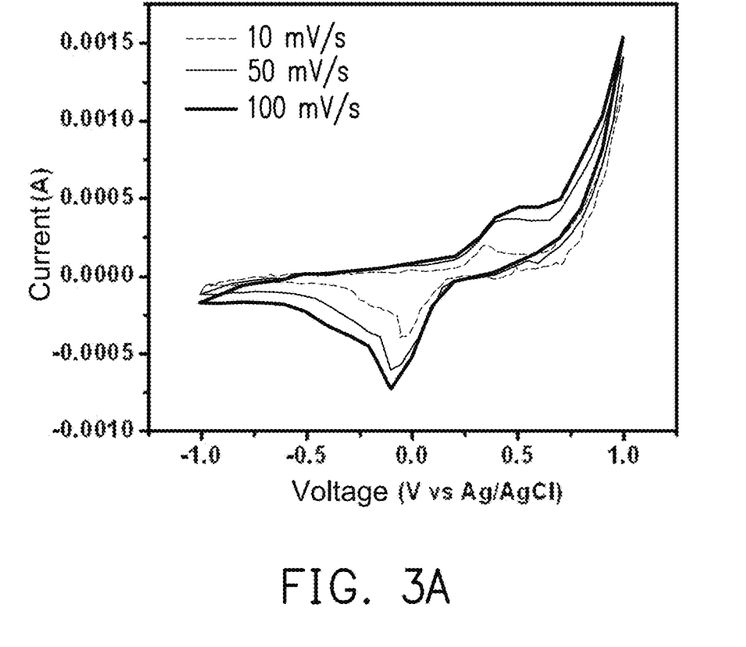
FIG. 3A to FIG. 3B are curve diagrams illustrating cyclic voltammetry analysis of supercapacitor electrodes according to Embodiment 1 and Embodiment 4 of the disclosure at different scanning rates.
Figure 3B:
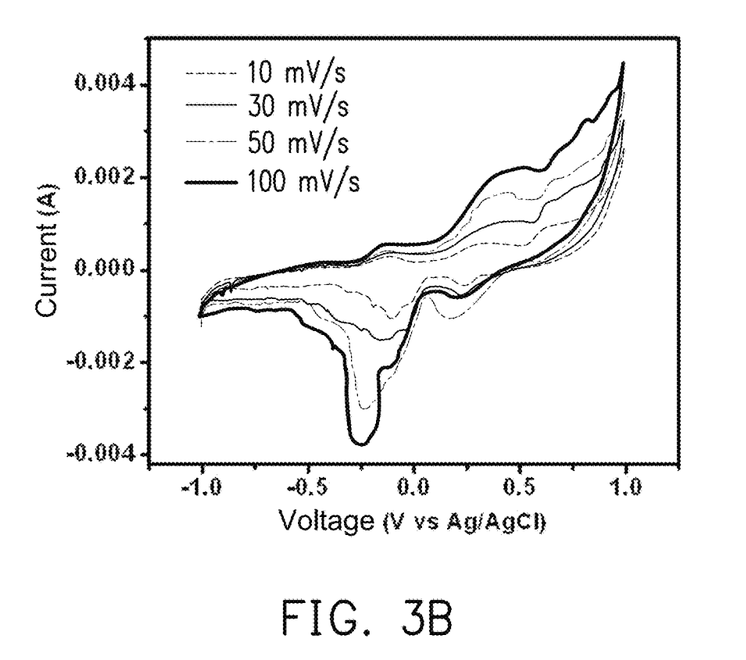
Figure 4A:
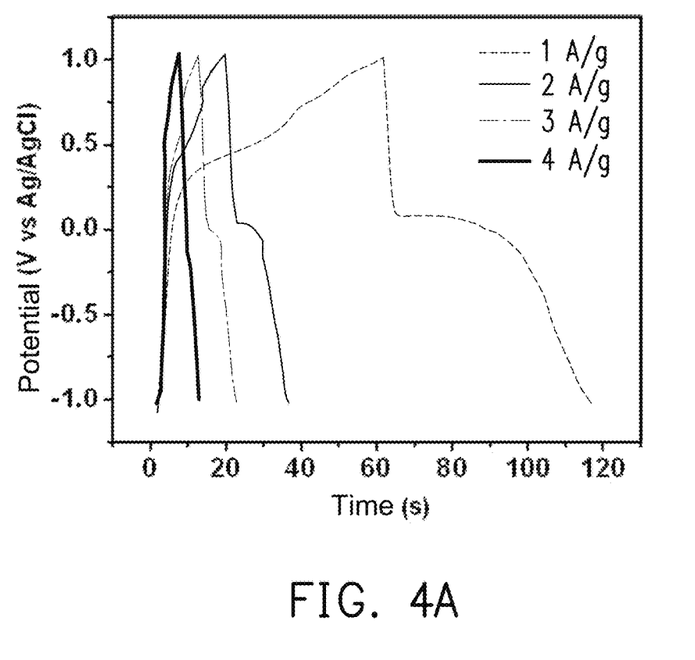
FIG. 4A to FIG. 4E are curve diagrams illustrating galvanostatic charge/discharge of supercapacitor electrodes according to various embodiments of the disclosure.
Figure 4B:
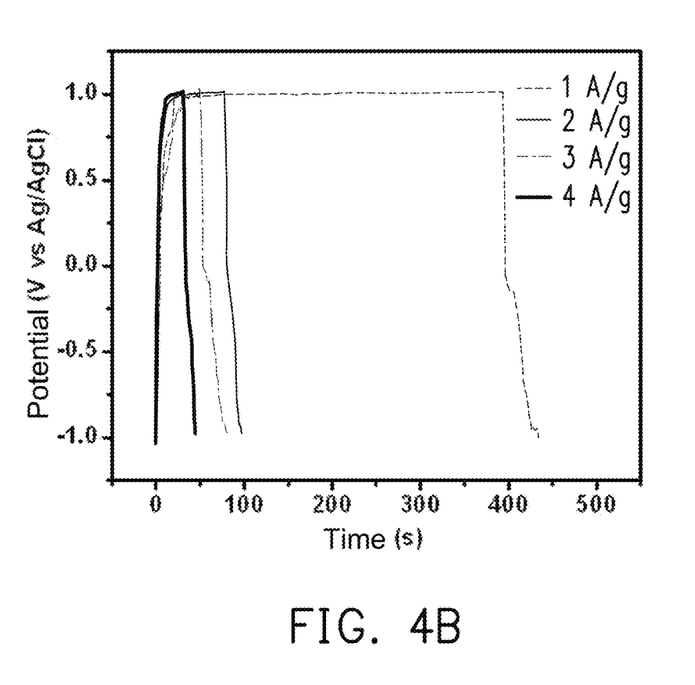
Figure 4C:
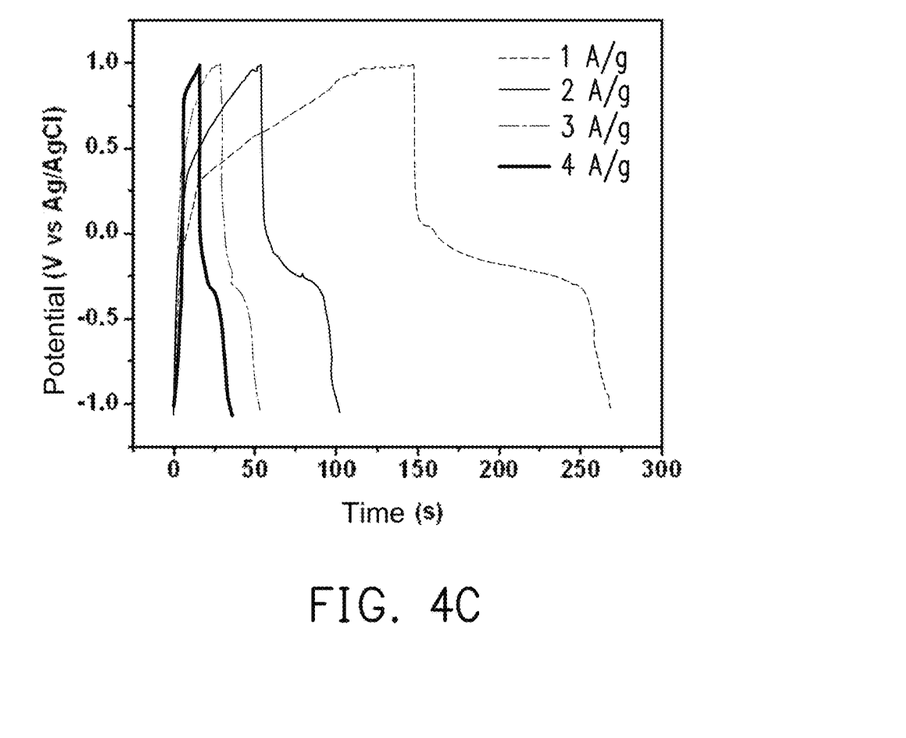
Figure 4D:
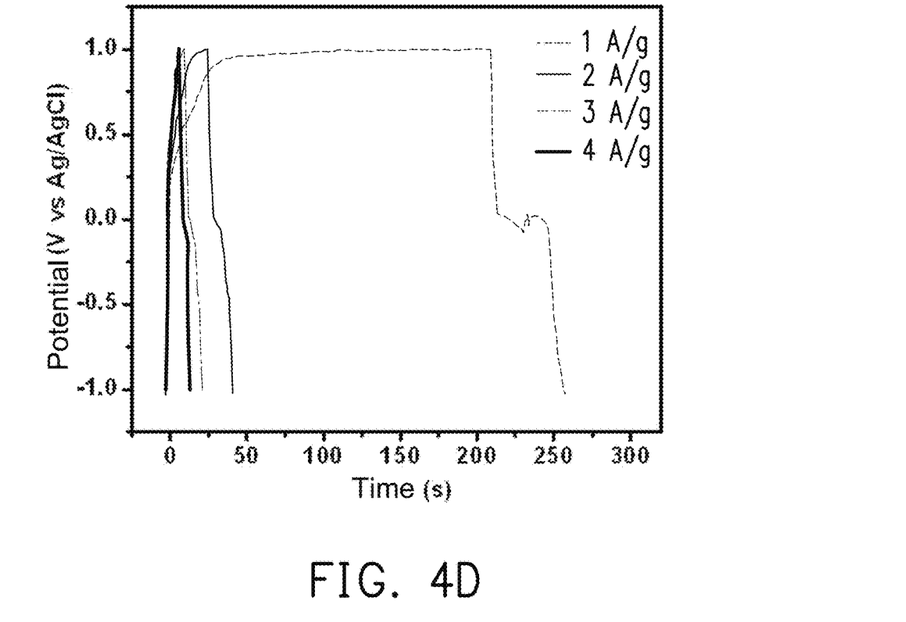
Figure 4E:
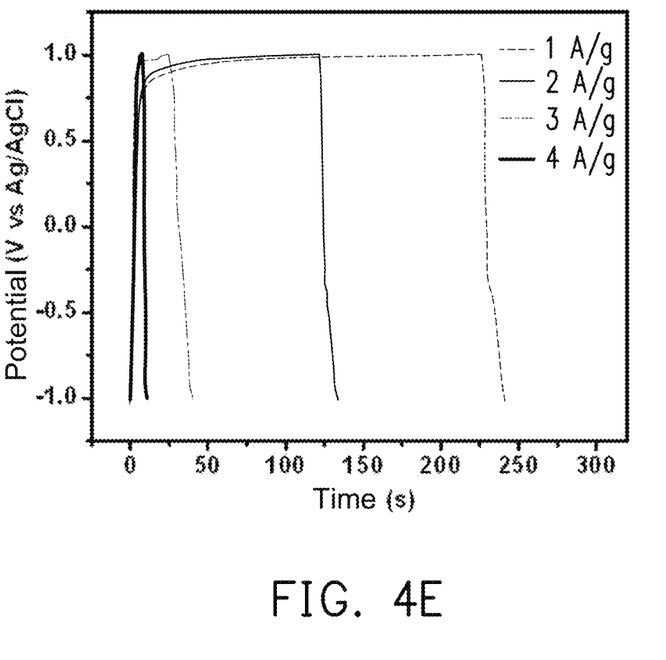

FIG. 3A to FIG. 3B are curve diagrams illustrating cyclic voltammetry analysis of the supercapacitor electrodes according to Embodiment 1 and Embodiment 4 of the disclosure at different scanning rates. With reference to FIG. 3A and FIG. 3B, in the present embodiment, cyclic voltammetry analysis was performed on the supercapacitor electrodes of Embodiment 1 and Embodiment 4 respectively at scanning rates of 10, 30, 50 and 100 mV/s. It can be seen from the results of FIG. 3A that all the curves in FIG. 3A have similar shapes, and no distortion occurs even when the scanning rate is increased by 10 times, it indicates that the supercapacitor electrode of Embodiment 1 has high reversibility. In addition, it can be seen from the results of FIG. 3B that all the curves in FIG. 3B also have similar shapes, and no distortion occurs even when the scanning rate is increased by 10 times, it indicates that although the supercapacitor electrode of Embodiment 4 has two nitrogen-doped ultra-nanocrystalline diamond layers and higher specific capacitance, it still has high reversibility.

[Galvanostatic Charge/Discharge Analysis]

FIG. 4A to FIG. 4E are curve diagrams illustrating galvanostatic charge/discharge of the supercapacitor electrodes according to various embodiments of the disclosure. With reference to FIG. 4A to FIG. 4E, in the present embodiment, in a voltage range of −1.0 V to 1.0 V, galvanostatic charge/discharge measurements were performed on the supercapacitor electrodes of Embodiments 1, 2, 4, 5, 6 respectively at current densities of 1, 2, 3 and 4 A/g.

It can be seen from the results of FIG. 4A to FIG. 4E that the supercapacitor electrodes of Embodiments 1, 2, 4, 5, 6 all have approximately symmetrical charge and discharge curves, it indicates that the supercapacitor electrodes of Embodiments 1, 2, 4, 5, 6 all have good reversibility and fast charge/discharge characteristics. In addition, compared with Embodiments 1, 2, 5, 6, Embodiment 4 has longer discharge time (about 120 seconds) at the current density of 1 A/g, it indicates that Embodiment 4 has better charge/discharge performance and more capacitance.

[Capacitance Retention Analysis]

Figure 5:
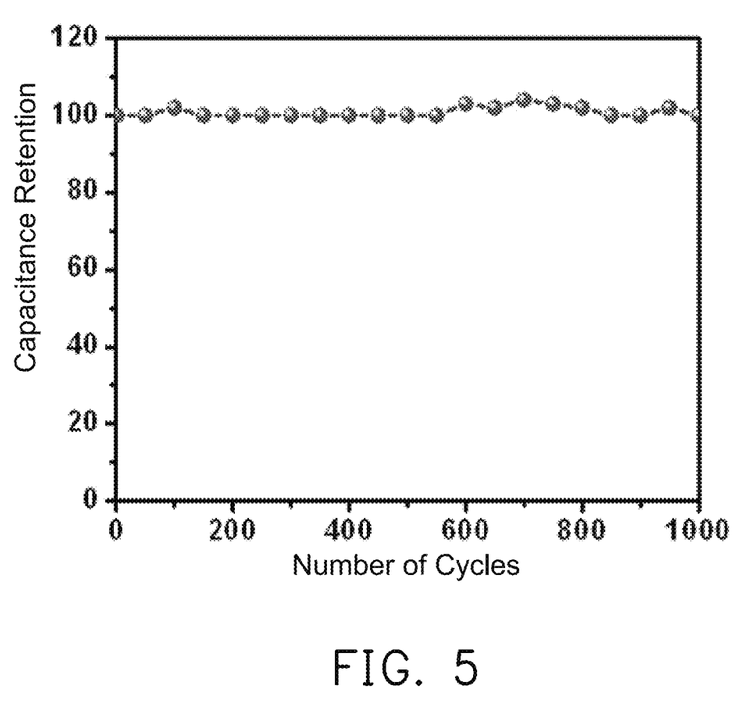
FIG. 5 illustrates capacitance retention analysis of the supercapacitor electrode according to Embodiment 4 of the disclosure.
Figure 6A:
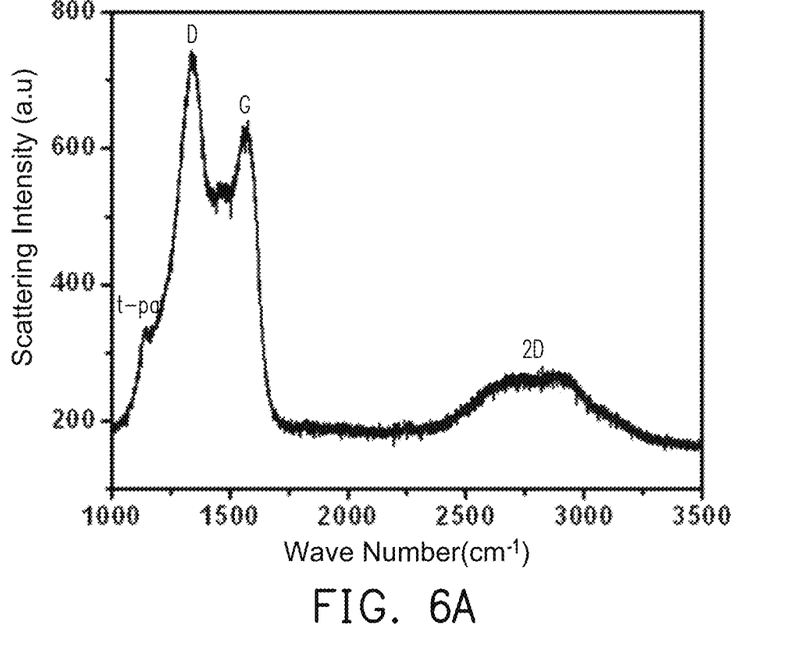
FIG. 6A to FIG. 6D illustrate Raman spectrometer analysis of supercapacitor electrodes according to Embodiments 3-6 of the disclosure.
Figure 6B:
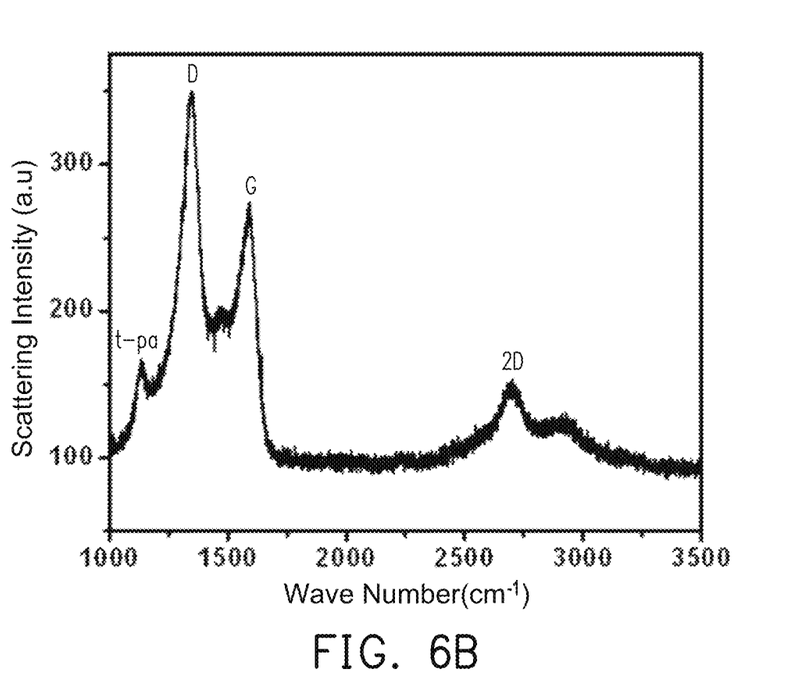
Figure 6C:
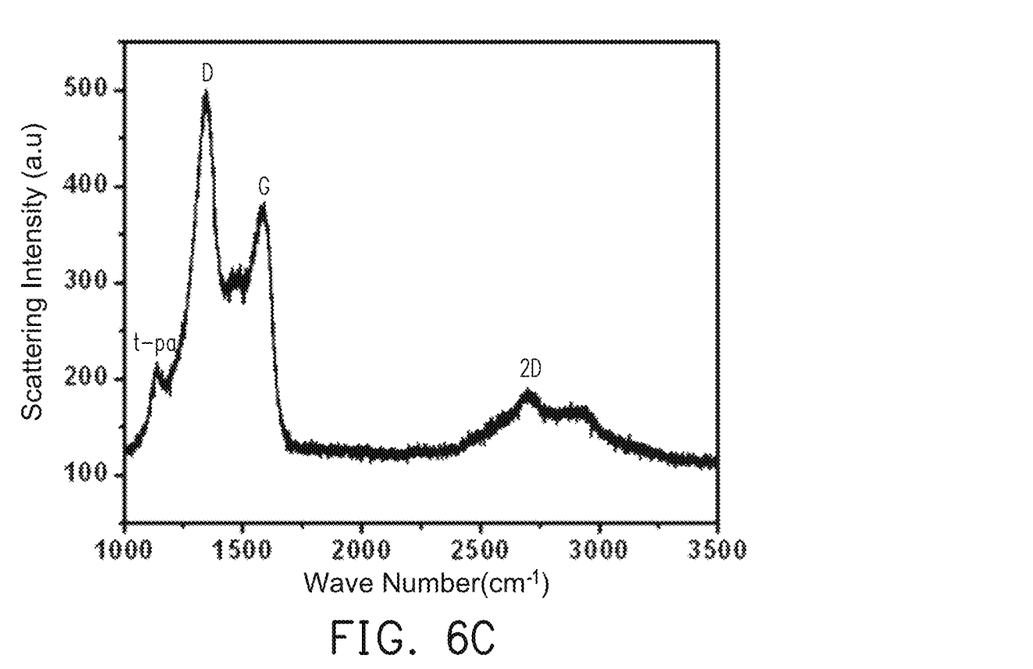
Figure 6D:
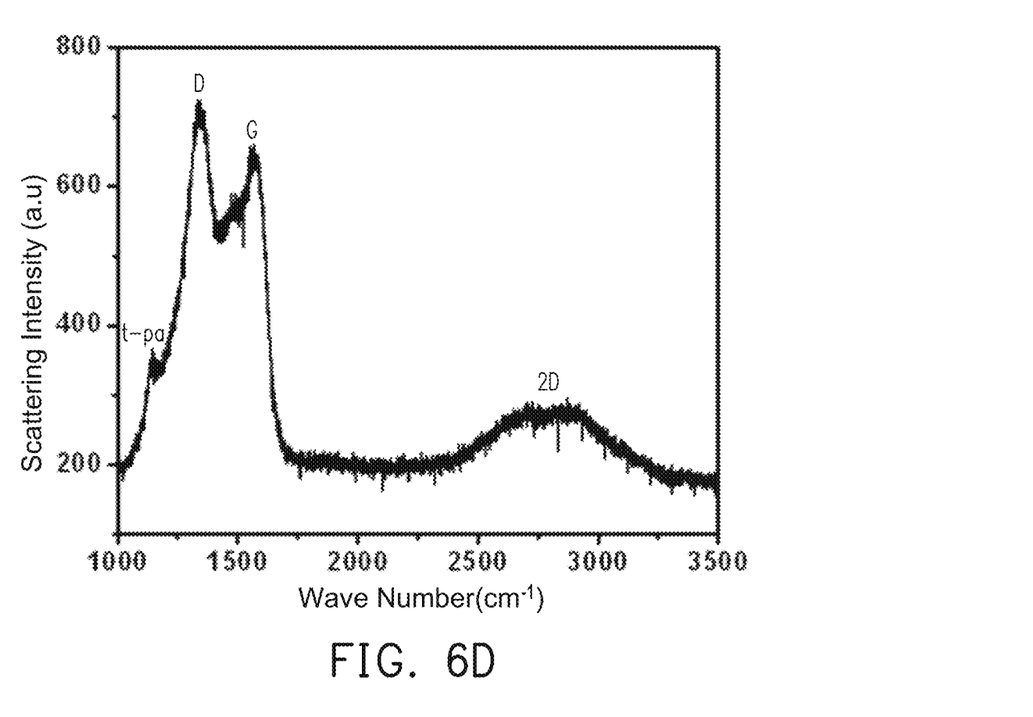

FIG. 5 illustrates capacitance retention analysis of the supercapacitor electrode according to Embodiment 4 of the disclosure. With reference to FIG. 5, in the present embodiment, a cycle stability of the supercapacitor electrode of Embodiment 4 at the current density of 2 A/g was tested, and a 1000-times repeated cyclic charge/discharge process was performed. After repeating the charge/discharge cycle 1000 times, compared with the corresponding first charge/discharge procedure, the supercapacitor electrode of Embodiment 4 still has a capacitance retention of 95% or more, it indicates that the supercapacitor electrode of Embodiment 4 has good capacitance retention and stability.

[Raman Spectrometer Analysis]

FIG. 6A to FIG. 6D illustrate Raman spectrometer analysis of the supercapacitor electrodes according to Embodiments 3-6 of the disclosure. With reference to FIG. 6A to FIG. 6D, in the present embodiment, a Raman spectrometer was used to analyze bonding characteristics of the nitrogen-doped ultra-nanocrystalline diamond layer in the supercapacitor electrodes of Embodiments 3-6. Next, it can be observed in Embodiments 3-6 that a characteristic peak of the nitrogen-doped ultra-nanocrystalline diamond layer at a wave number of about 1140 $cm^{-1}$ is v1, a characteristic peak at a wave number of about 1350 $cm^{-1}$ is a D band, a characteristic peak at a wave number of about 1580 $cm^{-1}$ is a G band, and a characteristic peak at a wave number of about 2700 $cm^{-1}$ is a 2D band. Here, v1 represents the presence of trans-polyacetylene (t-pa) at grain boundaries, the D band represents the presence of disordered carbon, and the G band represents the presence of graphitic phase.

Based on the foregoing, in the supercapacitor electrode and the manufacturing method thereof according to one or more embodiments of the disclosure, since the supercapacitor electrode has the nano-scale nitrogen-doped ultra-nanocrystalline diamond layer, the supercapacitor electrode of one or more embodiments of the disclosure has higher specific capacitance or better conductivity than the conventional supercapacitor electrode. In addition, in one or more embodiments of the disclosure, by optimizing the manufacturing method of the supercapacitor electrode, it is known that the supercapacitor electrode deposited with two nitrogen-doped ultra-nanocrystalline diamond layers respectively for the deposition time of 20 minutes may have even higher specific capacitance or better conductivity.

Although the disclosure has been described with reference to the above embodiments, it will be apparent to one of ordinary skill in the art that modifications to the described embodiments may be made without departing from the spirit of the disclosure. Accordingly, the scope provided in the disclosure is defined by the attached claims not by the above detailed descriptions.

What is claimed is:

1. A supercapacitor electrode, comprising:
    a substrate; and
    at least one nitrogen-doped ultra-nanocrystalline diamond layer disposed on the substrate, wherein the at least one nitrogen-doped ultra-nanocrystalline diamond layer is a dense continuous film, and a conductivity of the supercapacitor electrode is 130 S/cm or more,
    wherein the at least one nitrogen-doped ultra-nanocrystalline diamond layer has a uniform needle-shaped planar crystal structure and the at least one nitrogen-doped ultra-nanocrystalline diamond layer is only doped with nitrogen,
    wherein a specific capacitance of the supercapacitor electrode at a scanning rate of 10 mV/s is 100 F/g or more; and after the supercapacitor electrode is charged/discharged 1000 times to 2000 times, the supercapacitor electrode retains a specific capacitance of 95% or more.

2. The supercapacitor electrode according to claim 1, wherein when the number of the at least one nitrogen-doped ultra-nanocrystalline diamond layer is two, a specific capacitance of the supercapacitor electrode at a scanning rate of 10 mV/s is 200 F/g or more, and the conductivity of the supercapacitor electrode is 320 S/cm.

3. A supercapacitor, comprising a supercapacitor electrode, the supercapacitor electrode comprising:
    a substrate; and
    at least one nitrogen-doped ultra-nanocrystalline diamond layer disposed on the substrate, wherein the at least one nitrogen-doped ultra-nanocrystalline diamond layer is a dense continuous film, and a conductivity of the supercapacitor electrode is 130 S/cm or more,
    wherein the at least one nitrogen-doped ultra-nanocrystalline diamond layer has a uniform needle-shaped planar crystal structure and the at least one nitrogen-doped ultra-nanocrystalline diamond layer is only doped with nitrogen,
    wherein a specific capacitance of the supercapacitor electrode at a scanning rate of 10 mV/s is 100 F/g or more; and after the supercapacitor electrode is charged/discharged 1000 times to 2000 times, the supercapacitor electrode retains a specific capacitance of 95% or more.

4. The supercapacitor according to claim 3, wherein when the number of the at least one nitrogen-doped ultra-nanocrystalline diamond layer is two, a specific capacitance of the supercapacitor electrode at a scanning rate of 10 mV/s is 200 F/g or more, and the conductivity of the supercapacitor electrode is 320 S/cm.

5. A manufacturing method of a supercapacitor electrode, comprising:
    providing a substrate; and
    forming at least one nitrogen-doped ultra-nanocrystalline diamond layer on the substrate, wherein the at least one nitrogen-doped ultra-nanocrystalline diamond layer is a dense continuous film, and a conductivity of the supercapacitor electrode is 130 S/cm or more,
    wherein the at least one nitrogen-doped ultra-nanocrystalline diamond layer has a uniform needle-shaped planar crystal structure and the at least one nitrogen-doped ultra-nanocrystalline diamond layer is only doped with nitrogen, wherein a specific capacitance of the supercapacitor electrode at a scanning rate of 10 mV/s is 100 F/g or more; and after the supercapacitor electrode is charged/discharged 1000 times to 2000 times, the supercapacitor electrode retains a specific capacitance of 95% or more.

6. The manufacturing method of the supercapacitor electrode according to claim 5, wherein a method for forming the at least one nitrogen-doped ultra-nanocrystalline diamond layer on the substrate is microwave plasma chemical vapor deposition.

7. The manufacturing method of the supercapacitor electrode according to claim 5, wherein the step of forming the at least one nitrogen-doped ultra-nanocrystalline diamond layer on the substrate comprises:

setting a temperature of the substrate to 500° C. to 550° C.;

introducing a gas mixture composed of methane, hydrogen, argon, and nitrogen, wherein a flow ratio of the methane:the hydrogen:the argon:the nitrogen is 15 sccm:15 sccm:45 sccm:150 sccm; and depositing the at least one nitrogen-doped ultra-nanocrystalline diamond layer on the substrate for 10 minutes to 40 minutes.

8. The manufacturing method of the supercapacitor electrode according to claim 7, wherein when the number of the at least one nitrogen-doped ultra-nanocrystalline diamond layer is two, after depositing the at least one nitrogen-doped ultra-nanocrystalline diamond layer on the substrate, the method further comprises:

reducing the temperature of the substrate to room temperature, and maintaining the temperature for a period of time;

reheating the substrate to 500° C. to 550° C.; and depositing another nitrogen-doped ultra-nanocrystalline diamond layer on the nitrogen-doped ultra-nanocrystalline diamond layer for 10 minutes to 40 minutes.

* * * * *